United States Patent [19]

Wykoff

[11] Patent Number: 4,661,251

[45] Date of Patent: Apr. 28, 1987

[54] FILTER UNIT WITH FILTER MEDIA ARRANGEMENT FOR ENGAGEMENT WITH CONVEYOR FLIGHTS

[75] Inventor: Richard H. Wykoff, Livonia, Mich.

[73] Assignee: AMSTED Industries Incorporated, Chicago, Ill.

[21] Appl. No.: 806,484

[22] Filed: Dec. 9, 1985

[51] Int. Cl.⁴ .................. B01D 29/02; B01D 33/38; B01D 33/32; B01D 33/04

[52] U.S. Cl. .................. 210/396; 210/400; 210/401; 210/406; 210/111; 210/526

[58] Field of Search .............. 210/111, 396, 400, 401, 210/406, 413, 414, 526, DIG. 3

[56] References Cited

U.S. PATENT DOCUMENTS

| | | | |
|---|---|---|---|
| 3,084,987 | 4/1963 | Bounin | 210/401 |
| 3,087,620 | 4/1963 | Hirs | 210/406 |
| 3,091,336 | 5/1963 | Hirs | 210/111 |
| 3,288,296 | 11/1966 | Hirs | 210/400 |
| 4,192,747 | 3/1980 | Wykoff | 210/526 |
| 4,305,821 | 12/1981 | Crandall et al. | 210/400 |
| 4,310,424 | 1/1982 | Fremont et al. | 210/401 |
| 4,396,505 | 8/1983 | Willson et al. | 210/97 |
| 4,514,301 | 4/1985 | Parshall | 210/400 |

FOREIGN PATENT DOCUMENTS 997247  7/1965  United Kingdom .............. 210/401

Primary Examiner—Richard V. Fisher
Assistant Examiner—Linda S. Evans
Attorney, Agent, or Firm—Charles E. Bouton; Edward J. Brosius

[57] ABSTRACT

A filter unit is provided for separating solids from a liquid including a receiving tank and a vacuum chamber located beneath the tank and separated therefrom by a perforate septum. A closed loop filter media is trained about the tank and a length thereof is disposed beneath a flight conveyor assembly including chains which overlie the side margins and flights which engage ridges provided in the filter media. A filter media cleaning arrangement is provided at one end of the tank for removing solids from the filter media and transporting the solids for disposal.

10 Claims, 10 Drawing Figures

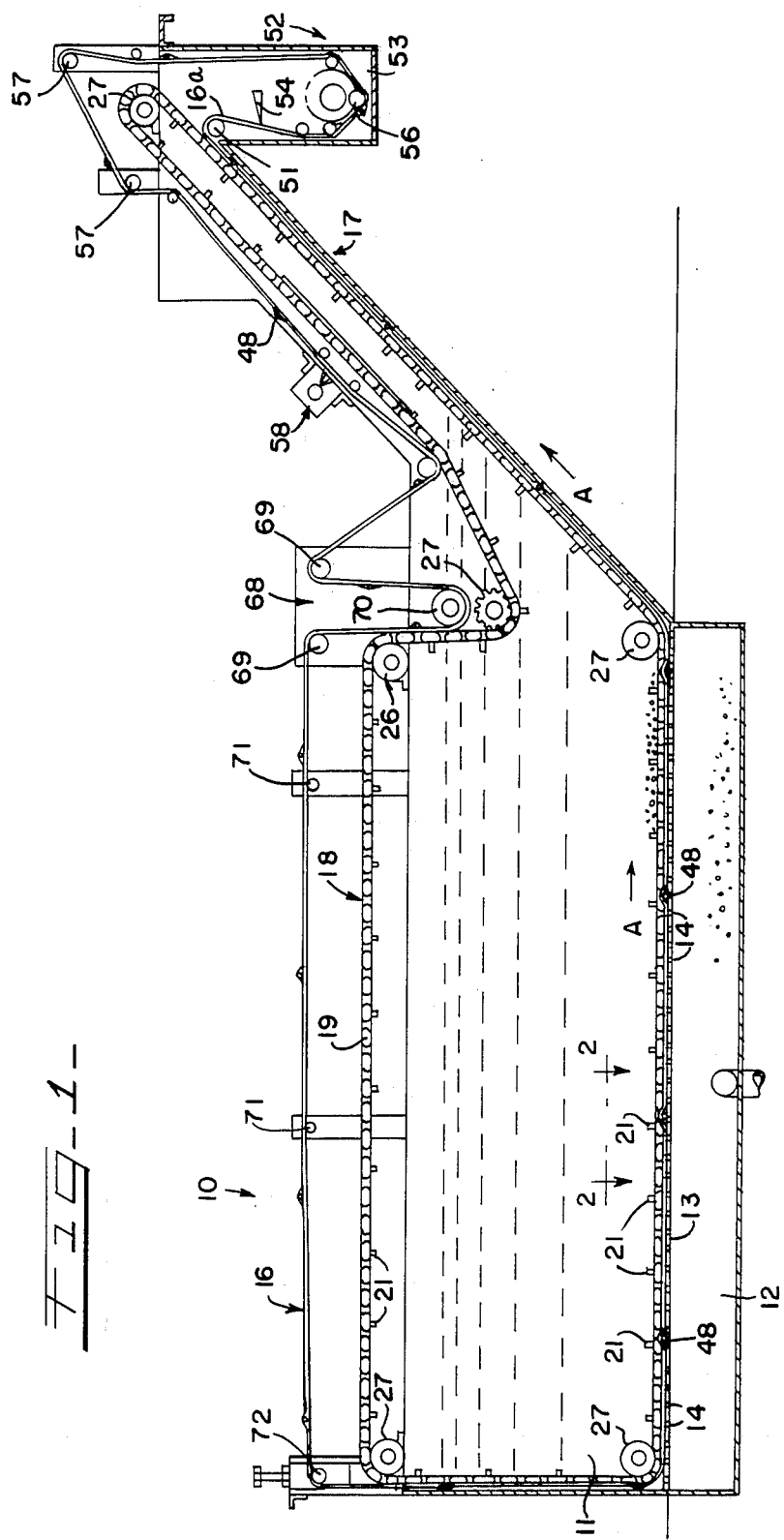

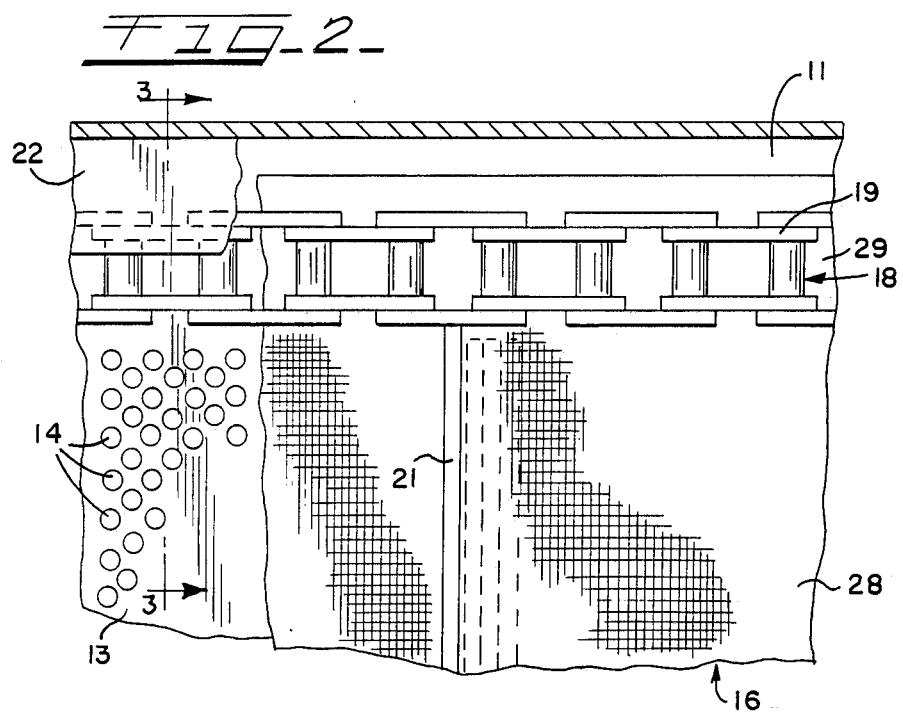
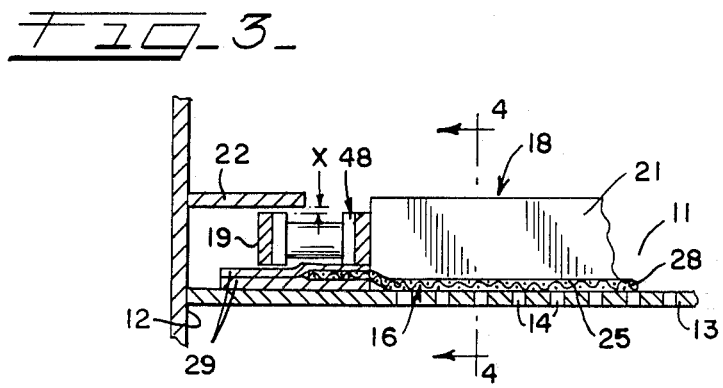
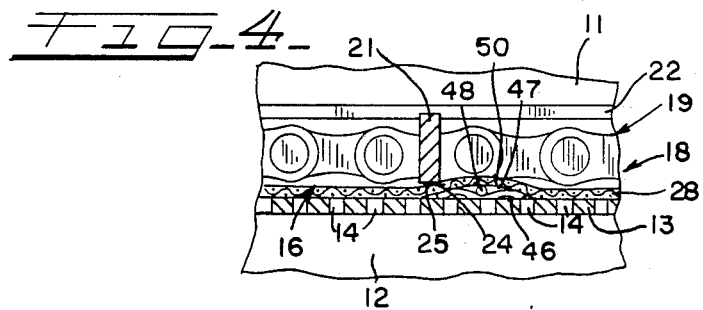

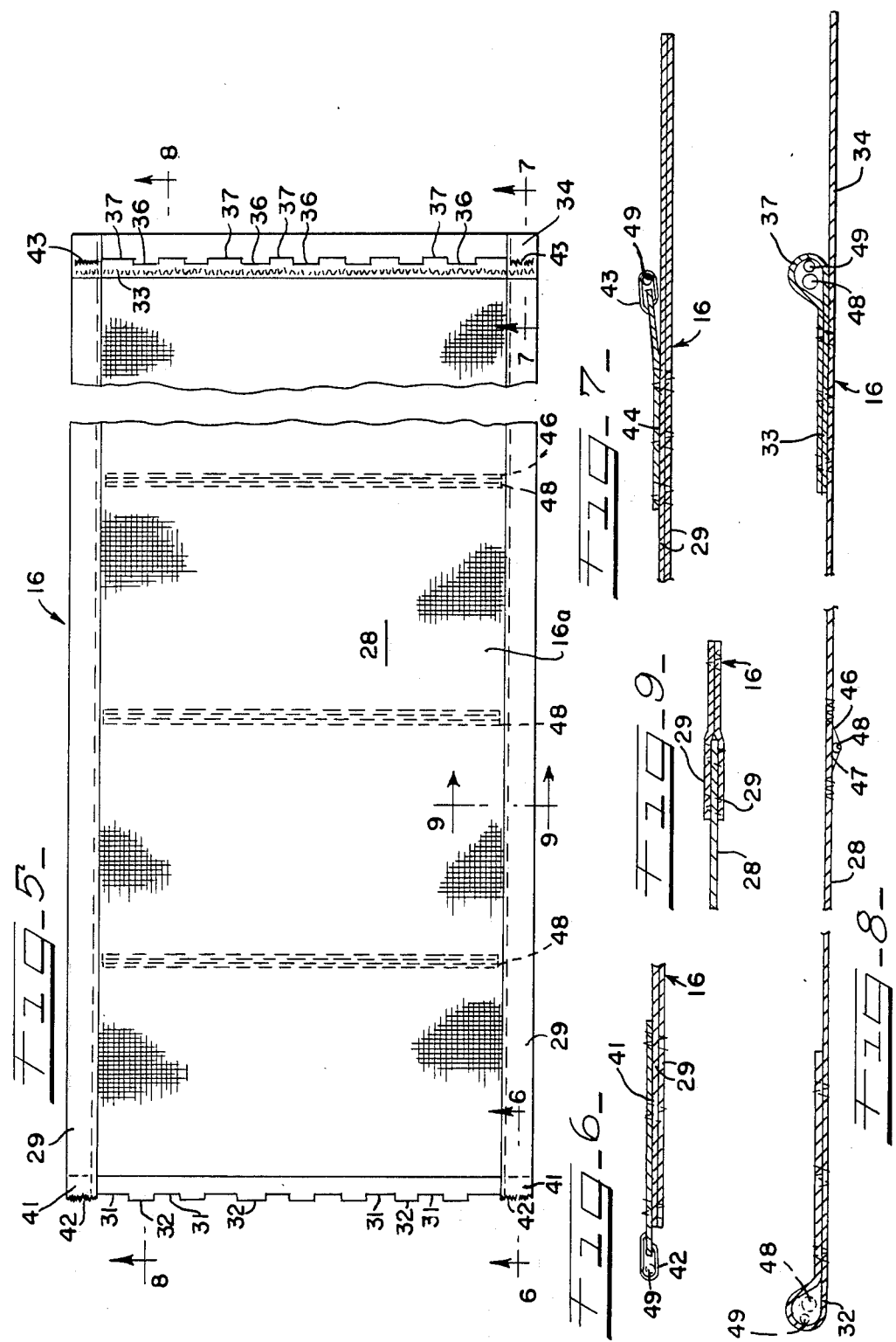

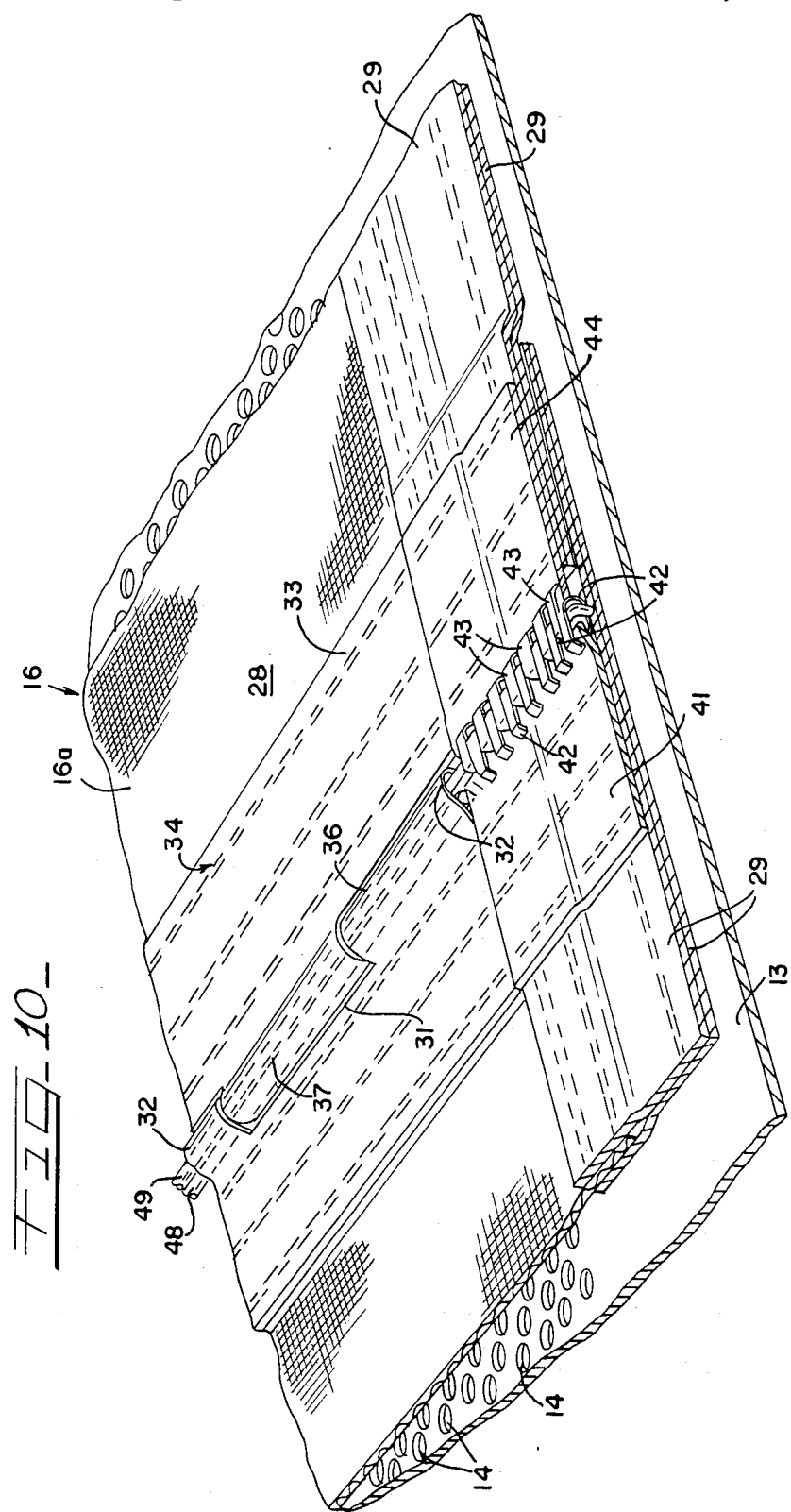

FILTER UNIT WITH FILTER MEDIA ARRANGEMENT FOR ENGAGEMENT WITH CONVEYOR FLIGHTS

FIELD OF THE INVENTION

The present invention relates generally to a filter apparatus and more particularly to an improved filter apparatus of the type employing a flexible filter sheet which continuously filters a suspended solid from a liquid suspension upon the application of a pressure differential on the opposite sides of the filter sheet.

BACKGROUND OF THE INVENTION

Filter apparatus of the type to which the present invention relates is shown and described in U.S. Pat. Nos. 3,087,620 and 3,091,336. The filter apparatus comprises generally a tank into which the liquid suspension is continuously introduced and a vacuum chamber located beneath the tank and separated therefrom by a perforate rigid septum over which a flexible filter sheet is movably disposed. The suspended solid is collected or deposited on one face of the sheet in the form of a cake and clarified liquid flows into the vacuum chamber as a vacuum is applied thereto.

It has been common practice to use a disposable filter sheet which is supported on a roll at one end of the filter unit and periodically index the sheet along the rigid septum by a power actuated conveyor. The conveyor includes spaced chains which engage the marginal edges of the sheet and flights disposed between the chain which engage the filter sheet laterally thereof along lengthwise spaced intervals. The conveyor is indexed at times dictated by the load of suspended solid deposited on the filter sheet. The frictional engagement of the chain and flights causes the filter sheet to be displaced lengthwise on the septum. The filter sheet with the suspended solid deposited thereon is then discarded at the discharge end of the unit.

Efforts have been made to repetitively use the filter media rather than discarding it after a single use. In such arrangements the filter media is arranged as an endless loop. The loop filter media is located in the filter unit with a length thereof disposed beneath the conveyor chains and flights as with the single use or discardable filter sheet or media. The loop is separated from engagement with the conveyor at the filter discharge end. Cleaning and suspended solid or cake removing means are provided at the discharge end for removing the deposited solids/cake from the filter media and for cleaning as by spraying. The filter media loop re-engages the septum at the forward end of the tank and is guided beneath the conveyor chains and flights.

In another embodiment of filter loop attachment, the loop has been fastened directly to the chain rather than using friction alone to accomplish the indexing movement.

During indexing movements, the vacuum to the vacuum chamber is momentarily cut-off so that the filter media is released from its normal gripping engagement with the perforate septum. This permits the filter sheet to be moved more easily along the face of the septum. Under some conditions, however, vacuum cut-off causes a backflow of the filtrate upwardly through the perforate septum. Such backflow causes the filter sheet to bow away from the septum and separate from engagement beneath the chain. This allows the unfiltered suspended solid to flow directly into the chamber and subsequently to its reuse point. This condition materially reduces the efficiency of the filter unit.

SUMMARY OF THE PRESENT INVENTION

By the present invention it is proposed to provide a filter unit of the foregoing type with a continuous loop filter sheet arrangement constructed so as to overcome the difficulties encountered hereto.

This is accomplished generally by a filter unit including a tank and a vacuum chamber beneath the tank, a perforate septum separating the tank from the chamber and filter sheet conveyor having chains and flights with an improved filter media having its ends detachably secured to form a continuous loop. The continuous loop filter media is provided with means forming a plurality of lengthwise spaced protuberances or ridges which extend above the lower edge of the flights so that the flights positively abut the filter media to provide a positive index or feed.

In the more specific aspects of the invention the ridges are spaced lengthwise at distances such that at least two flights are in engagement therewith along the septum. Preferably the ridges are spaced lengthwise equidistant to a multiple of lengthwise distances of the flights from each other.

Moreover each of the lengthwise spaced ridges terminate inwardly of the conveyor chains so as to assure positive engagement of the flights with the filter media.

Further positive feed or index is achieved by providing a hinge connection at the ends of the sheet including a hinge rod which serves to form a protuberance engagable with the flights.

The invention is further characterized by the provision of a new and improved suspended solid cake removing means at the discharge end of the filter unit. Such removal means includes a doctor or scraper located adjacent a cake suspended solid or cake removal screw conveyor.

Further features of the present invention will be apparent from the following detailed description.

BRIEF DESCRIPTION OF THE DRAWING

FIG. 1 is a side cross sectional view of a filter unit embodying the present invention.

FIG. 2 is a fragmentary plan view the filter apparatus taken generally along the line 2—2 of FIG. 1 and showing the conveyor chain overlying the filter media of the present invention.

FIG. 3 is an enlarged cross-sectional view taken generally along the lines of 3—3 of FIG. 2.

FIG. 4 is an enlarged cross-sectional view taken generally along the line 4—4 of FIG. 3.

FIG. 5 is a top plan view of the filter media of the present invention.

FIG. 6 is a cross-sectional view taken generally along the lines 6—6 of FIG. 5.

FIG. 7 is a cross sectional view taken generally along the lines 7—7 of FIG. 5.

FIG. 8 is a fragmentary cross sectional view taken generally along the lines 8—8 of FIG. 5.

FIG. 9 is a cross-sectional view taken generally along the lines 9—9 of FIG. 5.

FIG. 10 is a fragmentary perspective view of the filter media assembled as a continuous loop with some of the parts broken away to show underlying details of structure.

DESCRIPTION OF THE PREFERRED EMBODIMENT

Referring now to the drawings there is shown a filter unit 10 incorporating the structure of the present invention.

As shown in FIG. 1 the filter unit 10 includes generally a tank or reservoir 11 into which the liquid suspension having solids suspended therein is introduced.

A vacuum chamber 12 is located beneath a bottom wall or septum 13. The septum 13 includes a plurality of closely spaced orifices or perforations 14 through which the liquid flows into the chamber 12 after passage through a filter sheet or media 16 upon the application of a vacuum to the chamber 12.

The filter media 16 is moved in the direction of the arrow A as shown in FIG. 1 when solids or cake loading calls for indexing to maintain the desired filtering efficiency.

The indexing is accomplished by a filter conveyor assembly 18 including a pair of laterally spaced power driven chains 19 between which there is fixed a plurality of lengthwise spaced and transversly extending flights 21. Guide plates 22 along tank side walls serve to limit upwardly displacement of the chain to a clearance distance x and thereby maintain the chain in engagement with the marginal edges of the filter media 16.

The flights 21 are each preferably of substantially rectangular cross section to provide a lower edge 24 on the base 25 thereof as shown in particular in FIGS. 3 and 4.

As shown in FIG. 1 the conveyor chains 19 are driven by a drive gear 26 operated by motor (not shown) and trained over a plurality of spur gears 27 to form a continuous loop extending lengthwise of the tank 11 and over the discharge end 17.

A timing device or differential pressure switch (not shown) is used to initiate movement of the conveyor 18 whereby the chains 19 and flights 21 are operative to index the filter media 16 along the septum 13 and to the discharge end 17. During indexing movement the vacuum to the vacuum chamber 12 is shut off so that movement of the filter media 16 is released from the downward force exerted by the vacuum and thereby more freely movable.

For a more detailed description of the basic filter unit and its operation as briefly described above reference is made to U.S. Pat. Nos. 3,087,620 and 3,091,336 which are incorporated herein by reference thereto.

In accordance with the present invention there is provided a new and novel filter media 16 and filter media feed arrangement as shown in particular in FIGS. 5–10 inclusive. As shown the filter media 16 includes a rectangular panel 28 preferably of synthetic fibers such as polypropylene woven in a fiber mesh to provide a cake or solids depositing face 16a on one side thereof.

The filter panel 28 may be reinforced along its sides by superposed tapes 29 which are stitched to each other and the sides of filter panel 28 to provide side margins on which the conveyor chains 19 are adapted to rest. The tapes or side margins 29 are preferably made from plastic such as polypropylene.

As viewed in FIGS. 5 and 10 the left end of the filter panel 28 is provided with laterally spaced notches 31 and define tabs which are folded over toward the underside of the panel 28 to form transversely spaced pin receiving loops 32.

A plastic tape 33 is folded transversely across the opposite or right side of the panel 28 inwardly of the edge thereof and stitched there to define an end marginal flap 34. The tape 33 is provided with notches 36 and folded loop portion 37 which are in staggered relationship to the notches 31 and loops 32 on the left so that the opposing notches and loops on the opposite ends are nestable within each other when the panel 28 is joined at its ends as shown in FIG. 10.

Tabs 41 having closed wire loops 42 extending from one edge are fixed at each of the end corners of the left end mesh with wire loops 43 projecting from tabs 44 at the opposite ends of the tape 33.

Strips 46 extending laterally between the side margins 29 define transverse pockets or sleeves 47 which house rods 48. The rods 48 are of a diameter no less than the vertical clearance distance x between guides 22 and chains 19 for reasons which will be more fully explained hereafter. The rods 48 are preferably made from a plastic such as nylon or the like. It is to be noted that the rods 48 terminate inwardly of the chains 19 when the filter media 16 is positioned on the filter unit 10. The rods 48 are further spaced a lengthwise distance substantially equal to a multiple of the lengthwise spacing, between the flights 21. The rods 48 are operative to provide lengthwise spaced protuberances or ridges 50 as shown in particular on FIG. 4.

As shown in particular in FIG. 10 the filter media 16 is assembled on the filter unit 10 as a closed loop by interlocking the staggered loops 32 and 37 with a wire bar 49 which is of greater length than the rods 48 and extends through the meshed closed wire loops 37 and 39 at the marginal ends of the filter panel 28. When thus assembled the ends of the rod 48 located in the loops 32–37 does not extend into the meshing wire loops. The ends of the bar 49 may project outwardly of the wire loops at its ends which may be bent at right angles. The wire or rigid rod 49 thus forms in the nature of a pivot pin in a hinge connection.

As shown in FIG. 1 the continuous loop filter media 16 is disposed beneath the conveyor chains 19 and the flights 21 along the septum 13 and forward end wall of the tank 11. The media 16 continues up the inclined discharge end 17 and over guide bars 51 and into a suspended solid or cake discharge assembly 52. Located in the discharge assembly 52 is a doctor blade 54 which is disposed to scrape the deposited cake of suspended solid from the face 16a of the filter media 16. The separated cake is collected in a hopper 53 and discharged therefrom by means of a screw conveyor 56.

Upon exiting the discharge assembly 52 the filter media 16 is trained over spaced guide bars 57 to a wash station 58 at which time the residual cake on the filter media 16 is sprayed and removed.

The filter media 16 is then trained over a slack take up arrangement 68 including a pair of spaced rollers 69 mounted above the tank 11. A cylinder 70 is loosely suspended between the rollers 69 and is operative by the force of gravity to tauten the media loop 16 as shown in FIG. 1. The media 16 is supported above the tank 11 by bars 71 and a vertically adjustable roller 72 and then trained down the front or forward end of the tank 11.

As shown in FIG. 1 the flight conveyor assembly 18 is driven by the drive gear 26 which is in meshing engagement with one of the chains 19. The chains 19 overlie the side margins 25 and the meshing wires connecting loops 42–43. At the same time the leading or lower edge 24 of the flights 21, are operative to engage the protuberance or ridges 50 formed in the filter media 16 by the rods 48 as shown in particular in FIGS. 2-4 inclusive. This engagement of the edge 24 with the ridges 50 is operative to impart positive index movement to the filter media. Such positive movement is further enhanced by the presence of deposited solid or cake on the media which further inhibits slippage between the filter media 16 and flights 21. At the same time the chains 19 overlying the side margins 29 are operative to move the media through frictional contact therewith. It is to be noted that the clips or metal connecting wires 42 and 43 along the marginal edges also provide a positive grip with the chains 19 when the latter are disposed in contact.

It is particularly noted that the lengthwise spacing of the ridges 50 is such that when in engagement with the flights 21 the section of filter media disposed therebetween is held taut. This tautness substantially prevents any tendency of the filter media 16 to bow up either lengthwise or transversely of the width away from the septum. The prevention of such bowing of the filter media 16 maintains the marginal edges thereof beneath the chains 19 and thereby eliminates passage of unfiltered liquid into the chamber 1 through the septum 13. At the same time, the ridges 50 formed by the rods 48 are operative to assure positive indexing of the filter media 16.

What is claimed is:

1. In a filter unit having a tank for receiving a liquid suspension containing solids suspended therein, a vacuum chamber disposed beneath said tank and separated therefrom by a perforated septum through which filtered liquid flows from said tank into said vacuum chamber, a power driven flight conveyor assembly including a pair of laterally spaced chains overlying the sides of said septum and lengthwise spaced flights laterally extending between and fixed to said chains for movement therewith, a guide limiting upward movement of said chains and flights away from said septum, the improvement comprising
   a flexible filter media mounted as a closed loop on said filter unit
   said closed loop filter media having a portion thereof disposed between said flight conveyor assembly and said septum with said chains overlying marginal edges of said filter media, and lengthwise spaced upstanding ridges provided on said filter media engaging at least two of said flights whereby said flights are operative to positively index said filter media when said conveyor assembly is actuated.

2. The invention as defined in claim 1 wherein said ridges are of a height at least as great as the distance of limited upward movement of said chain in said guides.

3. The invention as defined in claim 2 wherein said ridges extend laterally between said chains.

4. The invention as defined in claim 3 wherein said ridges are spaced lengthwise a distance which is a multiple of the distances between the flights.

5. The invention as defined in claim 1 wherein laterally extending rods are fixed to said filter media to provide said ridges.

6. The invention as defined in claim 5 wherein lengthwise spaced and laterally extending sleeves are attached to said filter media and said rods are disposed in said sleeves.

7. The invention as defined in claim 1 wherein said filter media includes opposing ends having lengthwise staggered loops in meshing engagement to provide a transversely extending passage receiving a bar for joining the ends and thereby forming said closed loop filter media.

8. The invention as defined in claim 7 wherein said marginal ends of said filter media are provided with wire loops underlying said laterally spaced chains and receiving the ends of said bar.

9. The filter unit of claim 1 further comprising means for separating and removing said solids from said continuous loop filter media,
   said means for separating and removing including a doctor blade for scraping said suspended solids from said continuous loop filter and screw conveyor means disposed below said doctor blade so as to collect and transport the removed suspended solids away from said tank.

10. A filter unit comprising a flight conveyor assembly including laterally spaced chains and lengthwise spaced flights extending between said chains, a filter media comprising a rectilinear panel of filter material and lengthwise spaced ridges on said panel engagable with said flights, said ridges including laterally extending and lengthwise spaced sleeves, and a rod disposed in said sleeve to join said panel into a continuous loop of filter media.

* * * * *